US009604520B2

(12) United States Patent
Weber et al.

(10) Patent No.: US 9,604,520 B2
(45) Date of Patent: Mar. 28, 2017

(54) PNEUMATIC SPRING ARRANGEMENT OR PNEUMATIC SPRING DAMPER WITH INTEGRATED VALVE CONTROL

(71) Applicant: Vibracoustic CV Air Springs GmbH, Hamburg (DE)

(72) Inventors: Michael Weber, Buchholz (DE); Stephan Dehlwes, Norderstedt (DE)

(73) Assignee: VIBRACOUSTIC CV AIR SPRINGS GMBH, Hamburg (DE)

( * ) Notice: Subject to any disclaimer, the term of this patent is extended or adjusted under 35 U.S.C. 154(b) by 0 days.

(21) Appl. No.: 14/772,786

(22) PCT Filed: Mar. 4, 2013

(86) PCT No.: PCT/EP2013/000619
§ 371 (c)(1),
(2) Date: Sep. 4, 2015

(87) PCT Pub. No.: WO2014/135174
PCT Pub. Date: Sep. 12, 2014

(65) Prior Publication Data
US 2016/0016452 A1    Jan. 21, 2016

(51) Int. Cl.
*B60G 17/033* (2006.01)
*B60G 17/048* (2006.01)
(Continued)

(52) U.S. Cl.
CPC ............ *B60G 17/033* (2013.01); *B60G 11/27* (2013.01); *B60G 11/58* (2013.01);
(Continued)

(58) Field of Classification Search
CPC B60G 17/0485; B60G 11/27; B60G 17/0521; B60G 11/58; B60G 17/033;
(Continued)

(56) References Cited

U.S. PATENT DOCUMENTS 5,518,225 A * 5/1996 Gubitz ................... B60G 15/12
267/64.24
5,649,692 A 7/1997 Gilsdorf et al.
(Continued)

FOREIGN PATENT DOCUMENTS

CN            1410287 A    4/2003
CN         200942701 Y    9/2007
(Continued)

*Primary Examiner* — Thomas J Williams
*Assistant Examiner* — Mariano Sy
(74) *Attorney, Agent, or Firm* — Leydig, Voit & Mayer, Ltd.

(57) ABSTRACT

An air spring assembly or air spring damper with an integrated valve control for controlling a level position of a vehicle or of a driver's cab includes a rolling tube, a lid and an air spring bellows which together delimit a pressure chamber with compressed air. A control valve includes an actuation device for feeding compressed air into the pressure chamber or for discharging compressed air from the pressure chamber. A compression spring device has a first end operatively connected to the rolling piston or the lid and a second end operatively connected to the actuation device. The compression spring device is configured with at least two parts including a central spring facing towards the rolling piston or the lid and a control valve biasing spring facing towards the control valve. The central spring is biased to a greater extent than the control valve biasing spring.

12 Claims, 2 Drawing Sheets

(51) Int. Cl.
*B60G 17/052* (2006.01)
*F16F 9/04* (2006.01)
*B60G 11/27* (2006.01)
*B60G 11/58* (2006.01)
*B60G 17/056* (2006.01)
*B62D 33/06* (2006.01)
*F16F 13/00* (2006.01)

(52) U.S. Cl.
CPC ..... *B60G 17/0485* (2013.01); *B60G 17/0521* (2013.01); *B60G 17/0525* (2013.01); *B60G 17/0565* (2013.01); *B62D 33/0608* (2013.01); *F16F 9/04* (2013.01); *F16F 13/002* (2013.01); *B60G 2204/1262* (2013.01); *B60G 2206/424* (2013.01); *B60G 2400/252* (2013.01); *B60G 2500/202* (2013.01); *B60G 2500/30* (2013.01); *F16F 2238/02* (2013.01)

(58) Field of Classification Search
CPC ............ B60G 17/0565; B60G 17/0525; B60G 2204/1262; B60G 2206/424; B60G 2500/202; F16F 9/04; F16F 13/002; F16F 2238/02; B62D 33/0608
USPC ............ 267/64.11, 64.21, 122, 64.23, 64.24, 267/64.27
See application file for complete search history.

(56) References Cited

U.S. PATENT DOCUMENTS

| | | | |
|---|---|---|---|
| 6,332,624 | B1 | 12/2001 | Gilsdorf et al. |
| 6,536,749 | B1* | 3/2003 | Luhmann ............... B60G 15/12 267/220 |
| 2001/0024004 | A1* | 9/2001 | Pradel ................... B60G 17/044 267/64.27 |
| 2003/0067124 | A1 | 4/2003 | Kang |
| 2003/0137086 | A1 | 7/2003 | Gross et al. |
| 2007/0023981 | A1* | 2/2007 | Helmling ............... B60G 15/14 267/64.15 |
| 2010/0237549 | A1* | 9/2010 | Jeischik ................. B60G 15/14 267/122 |
| 2015/0191068 | A1* | 7/2015 | Kantor ................... B60G 11/27 280/6.157 |
| 2016/0108985 | A1* | 4/2016 | Pniewski ............... F16F 9/057 267/64.24 |

FOREIGN PATENT DOCUMENTS

| | | |
|---|---|---|
| DE | 4406607 A1 | 9/1995 |
| DE | 4409252 A1 | 9/1995 |
| DE | 10003045 A1 | 9/2000 |
| DE | 10200553 C1 | 7/2003 |
| DE | 102010012346 A1 | 9/2011 |
| EP | 1327538 A2 | 7/2003 |
| EP | 2131059 A2 | 12/2009 |
| EP | 2275703 A1 | 1/2011 |

\* cited by examiner

PNEUMATIC SPRING ARRANGEMENT OR PNEUMATIC SPRING DAMPER WITH INTEGRATED VALVE CONTROL

CROSS-REFERENCE TO PRIOR APPLICATION

This application is a U.S. National Stage Application under 35 U.S.C. §371 of International Application No. PCT/EP2013/000619 filed on Mar. 4, 2013. The International Application was published in German on Sep. 12, 2014 as WO 2014/135174 A1 under PCT Article 21 (2).

FIELD

The present invention relates to an air spring assembly or an air spring damper with an integrated valve control for controlling the level position of a vehicle or of a driver's cab, wherein the air spring assembly or the air spring damper comprises a rolling tube and a lid as well as an air spring bellows which, together with the rolling tube and the lid, delimits a pressure chamber with compressed air, and a control valve for feeding compressed air into the pressure chamber or for discharging compressed air from the pressure chamber, and a compression spring device, the one end of which is operatively connected to the rolling piston or the lid, and the other end of which is operatively connected to the actuation device for the control valve in order to switch the latter depending on the air spring stroke.

In order to improve the spring comfort of vehicles or driver's cabs, air spring units are used to keep a desired level of the vehicle or driver's cab constant or change it in an adjustable manner under different loads or weights.

In the process, the pressure in the air chamber is changed by feeding compressed air or discharging compressed air depending on the spring stroke. The control valves required for this purpose are predominantly disposed outside the air spring. However, solutions in which the control valves are accommodated within the air spring are also known. The accommodation of the control valve within the air spring has advantages both with respect to production and operation.

BACKGROUND

The documents DE 44 06 607 A1, DE 100 03 045 A1, DE 102 00 553 C1 and EP 2 275 703 A1 show control valves that are accommodated within the compressed air space of an air spring. In these configurations, the control valves are attached to the rolling piston for the rolling bellows of the air spring. The valves are actuated via control members that are also disposed on the piston, with the exception of Document DE 44 06 607 A1, in which a sleeve attached to the top part of the air spring is provided for actuating the valve. These control mechanisms cause a movable air feed or discharge via the rolling piston, which entails difficulties with regard to space.

A generic air spring assembly with an integrated control valve in which the control valve is actuated by a compression spring is known from DE 10 2010 012 346 A1. To this end, the compression spring, with its one end face, is attached to the rolling piston or the lid and, with its other end, is operatively connected to the tappet of the control valve disposed opposite. What is disadvantageous in this air spring assembly is that relatively long spring strokes for switching the valve are provided.

SUMMARY

In an embodiment, the present invention provides an air spring assembly or air spring damper with an integrated valve control for controlling a level position of a vehicle or of a driver's cab, including a rolling tube, a lid and an air spring bellows which, together with the rolling tube and the lid, delimits a pressure chamber with compressed air. A control valve includes an actuation device for feeding compressed air into the pressure chamber or for discharging compressed air from the pressure chamber. A compression spring device has a first end operatively connected to the rolling piston or the lid and a second end operatively connected to the actuation device of the control valve in order to switch the control valve depending on an air spring stroke. The compression spring device is configured with at least two parts including a central spring facing towards the rolling piston or the lid and a control valve biasing spring facing towards the control valve. The central spring is biased to a greater extent than the control valve biasing spring.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a longitudinal section through an air spring assembly according to an embodiment of the invention with spring strokes drawn in.

DETAILED DESCRIPTION

Figure 1:
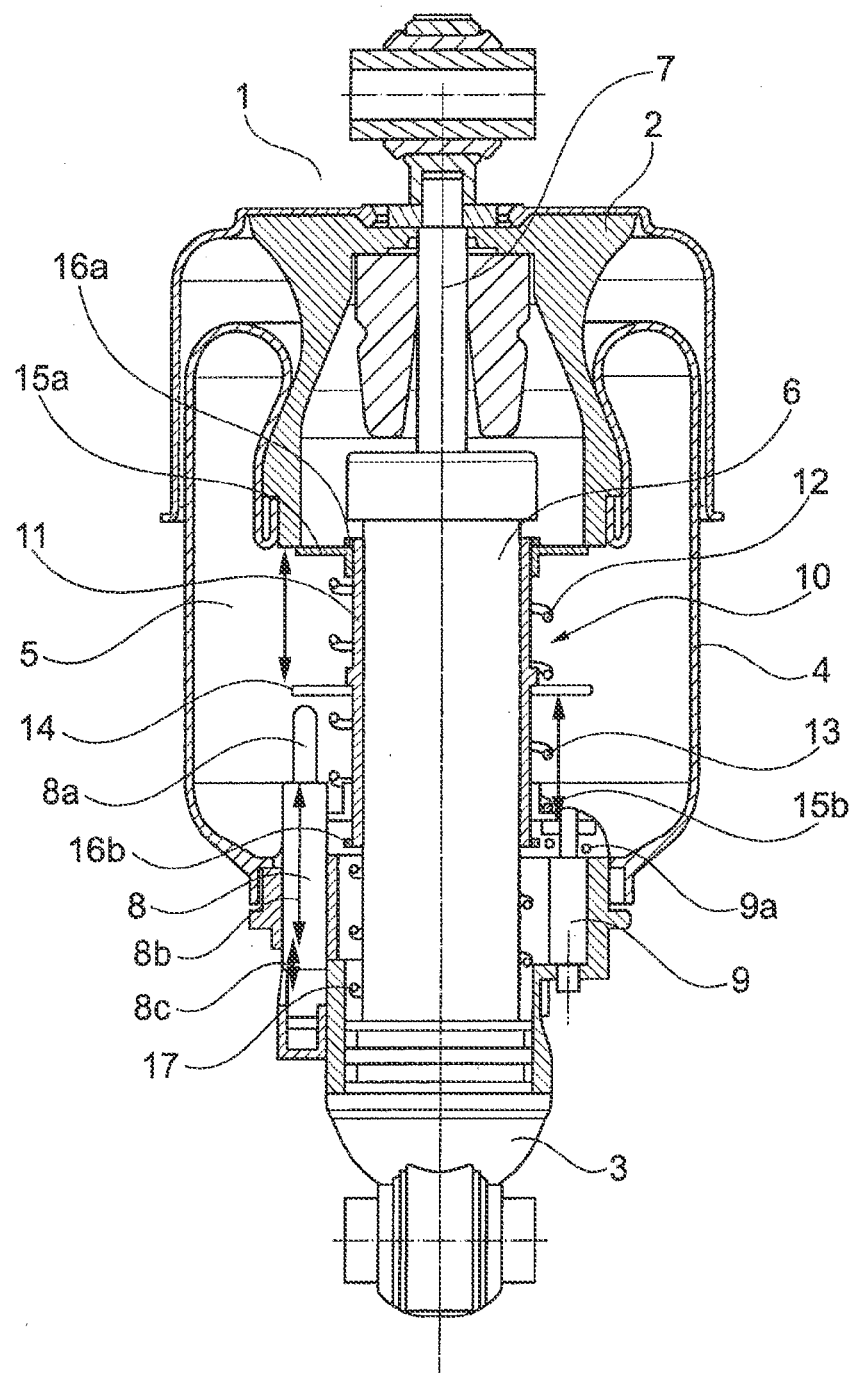
Figure 2:
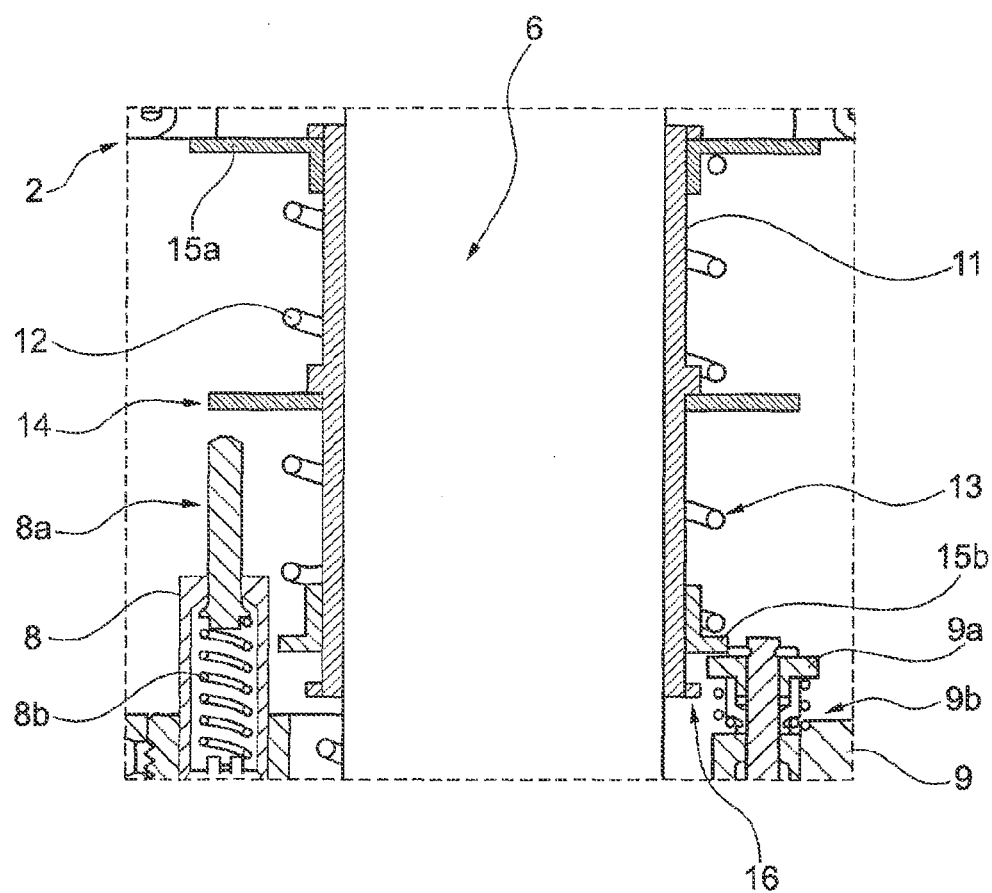
FIG. 2 shows in a longitudinal sectional view, a detailed drawing of a lower portion of the air spring assembly from FIG. 1.

An embodiment of the present invention provides a development of a generic air spring assembly in such a way that, design-wise, it has a simple and rugged structure and can be switched via short spring strokes.

In an embodiment, the invention provides an air spring assembly with an integrated valve control for controlling the level position of a vehicle or of a driver's cab, wherein the air spring assembly comprises a rolling tube and a lid as well as an air spring bellows which, together with the rolling tube and the lid, delimits a pressure chamber with compressed air, a control valve for feeding compressed air into the pressure chamber or for discharging compressed air from the pressure chamber, and a compression spring device, the one end of which is operatively connected to the rolling piston or the lid, and the other end of which is operatively connected to the actuation device for the control valve in order to switch the latter depending on the air spring stroke, that the compression spring device is configured with at least two stages, with a central spring facing towards the rolling piston or the lid and a control valve biasing spring facing towards the control valve, the central spring being biased to a greater extent than the control valve biasing spring.

The inventors recognized the fact that not only can the spring strokes for switching be shortened due to the two-part structure of the spring device and the different dimensioning of the spring forces, but a switching order can also be set at the same time. When the air spring is contracted, the control valve biasing spring, due to the lower bias, is compressed first, whereas the central spring remains unchanged. Only when the control valve biasing spring reaches a stop position, the central spring is also compressed—in the absence of further springs with lower spring forces.

In a preferred embodiment of the invention, it is provided that the compression spring device comprises a guide tube on which the central spring and the control valve biasing spring are disposed. A secure guidance of the springs during compression and expansion without jamming is thus ensured.

Preferably, the guide tube is mounted in a freely movable manner in the axial direction between the lid and the rolling tube. In this embodiment, control means for switching the control valve can be provided on the guide tube. The arrangement consisting of the central and the control valve biasing spring in this case serves for clamping the guide tube against the rolling tube and the actuation device for the control valve.

According to a preferred embodiment, a hydraulic damping body is associated with the air spring. Such a damping body is generally disposed centrally in the interior of the air spring. In this case, the guide tube is preferably disposed in such a way that it encloses the cylindrical damping body and is able to slide easily on the latter.

In a middle portion of the guide tube, a peripheral stop can be provided, on which the springs are respectively supported with their mutually facing ends.

Biasing members are provided at both ends of the guide tube for biasing the springs. The biasing members are freely movable on the guide tube between stops. Though the biasing members thus delimit the expansion stroke of the springs, they permit further compression.

The bias of the control valve biasing spring is preferably so high that, directly after touching the actuation means for the control valve, the switching process is carried out completely and a defined switching state is set quickly and reliably, irrespective of tolerances in the dimensioning of the spring or the fitting of the spring.

According to another preferred embodiment of the invention, the control valve is configured in two parts, with an inlet valve and an outlet valve. Preferably, spring valves are used for the inlet and the outlet valve. By balancing the spring forces of all participating springs in the air spring relative to one another, an autonomously controlled switching order during contraction and extension of the air spring can then be realized in a simple and reliable manner.

For constructional reasons, the inlet and the outlet valve are preferably disposed in the region of the lid of the air spring. In this embodiment of the invention, the guide tube has control means both for the inlet and the outlet valve. The control means are preferably disposed on the guide tube in an axially offset manner. Such a first control means can, for example, be formed by the radially protruding stop for the central spring and the control valve biasing spring. The second control means can be provided at the end of the guide tube facing towards the control valve biasing spring.

If the two valves are arranged at the same end of the air spring, they have to be configured in such a way that the one valve closes when the other one opens. In the above-described arrangement of the valves in the region of the lid, the outlet valve and the inlet valve are configured in such a way that the outlet valve is closed in the compressed position of the air spring and the inlet valve is open. In the same way, the outlet valve is open in the expanded position of the air spring and the inlet valve is closed.

The inlet valve preferably has a two-stage configuration.

However, the valves can also be disposed in the region of the rolling piston, or opposite from each other, i.e. one valve in the region of the rolling piston, the other valve in the region of the lid. The configuration of the control members of the guide tube adapted thereto is easily possible for the person skilled in the art.

According to another preferred embodiment of the invention, an auxiliary compression spring for assisting the movement of the guide tube during expansion is provided.

In FIG. 1, an air spring assembly 1 according to a preferred embodiment can be seen, which comprises a rolling tube 2 and a lid 3 as well as an air spring bellows 4 consisting of an elastomeric material. The rolling tube 2, the lid 3 and the air spring bellows 4 delimit a pressure chamber 5 that can be pressurized with compressed air. Without limiting the generality, a hydraulic damper body 6 with a piston rod 7 is integrated into the air spring assembly 1 in the embodiment shown. The hydraulic damper body 6 and the piston rod 7 are disposed centrally in the interior of the pressure chamber 5. The air spring bellows 4 is attached to the rolling piston 2 on the one hand and the lid 3 on the other hand by means of attachment means not addressed here in closer detail. Sealing members provide for sealing the pressure chamber against the outside.

In the event of an air spring stroke, the air spring bellows 4 rolls on the rolling tube 2 in a manner known per se. The feed or discharge of the compressed air takes place via an integrated control valve which, in the embodiment shown, has a two-part configuration as an air inlet valve 8 and an air outlet valve 9 separate therefrom. Both valves disposed in the region of the lid 3 are configured in the preferred embodiment shown as spring valves with corresponding actuation means.

According to an embodiment of the invention, a compression spring assembly 10 is provided for opening and closing the valves 8, 9. According to an embodiment of the invention, the compression spring assembly 10 has a two-stage configuration. It comprises two compression springs disposed in a row, which will be addressed in more detail below. Furthermore, in the embodiment of the invention shown, it comprises a guide tube 11 coaxially surrounding the damper body 6. The guide tube 11 can freely slide on the damper body 6. The compression springs enclose the guide tube 11 coaxially. A central spring 12 is located in the upper region of the guide tube 11 and is associated with the rolling tube 2. This is followed by a control valve biasing spring 13 associated with the outlet valve 9. Both compression springs are disposed in a row and, with their mutually facing ends, are supported on a radially protruding stop 14 disposed in the middle portion of the guide tube 11. The respectively opposite ends of the compression springs are held by biasing members 15a, 15b, which lead to a defined bias of the compression springs 12, 13. According to the invention, the central spring 12 is biased to a greater extent than the control valve biasing spring 13. End stops 16a, 16b are provided on both ends of the guide tube 11. The biasing members 15a, 15b are disposed so as to be freely displaceable in the axial direction on the guide tube 11 between the end stops 16a, 16b and the radially protruding stop 14. Though the biasing members 15a, 15b thus delimit the expansion stroke of the compression springs 12, 13, they permit further compression.

The radially protruding stop 14 disposed in the middle portion of the guide tube is configured in such a way that, at the same time, it serves as a control means for actuating the valve tappet 8a of the inlet valve 8. The control means for actuating the outlet valve 9 is formed by the biasing member 16b. A closing means 9a for the outlet valve 9, which is pressed by the valve spring 9b against the biasing member, is supported on the lower side of the biasing member 16b.

When the air spring assembly 1 is compressed, the rolling tube 2 moves downwards and exerts pressure on the biasing member 15a. The guide tube 11 slides downwards on the damper body. The biasing member 15b, which is supported on the actuation device 9a of the outlet valve 9, forms a stop for this movement. The outlet valve remains closed. Due to the lower bias, the control valve biasing spring 13 is compressed, the guide tube 11 moves further downwards and in the process slides past the biasing member 15b.

During this downward movement, the stop 14 finally, after bridging an idling portion, reaches the tappet 8a of the inlet valve 8 and moves the former downwards against the spring force of the valve spring 8b. The inlet valve is open. In the case of a continued downward movement, a second stage with a valve spring 8c of the inlet valve is actuated.

In the case of the rest position of the air spring assembly 1, the idling portion is dimensioned in such a way that, on the one hand, a short switching distance is ensured, but, on the other hand, valve activity is not initiated already by the smallest deflections, as is known from the prior art.

Only when all of the above-described springs 13, 8b, 8c are at the stops, the central spring 12 continues the spring action and is compressed.

When the air spring assembly 1 expands, the rolling tube 2 moves upwards. Supported by the auxiliary spring 17, the guide tube 11 moves upwards. The control valve biasing spring 13 expands, the biasing member 15b slides downwards on the guide tube 11 in the direction towards the end stop 16b. After bridging this idling portion, the control valve biasing spring 13 comes to a stop, the biasing member 15b is taken along and moved upwards and releases the closing member 9a of the outlet valve 9. The latter is opened by the force of the valve spring 9b.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An air spring assembly or air spring damper with an integrated valve control for controlling a level position of a vehicle or of a driver's cab, comprising:
   a rolling tube;
   a lid;
   an air spring bellows which, together with the rolling tube and the lid, delimits a pressure chamber with compressed air;
   a control valve including an actuation device for feeding compressed air into the pressure chamber or for discharging compressed air from the pressure chamber; and
   a compression spring device, a first end of the compression spring device being operatively connected to the rolling tube or the lid, and a second end of the compression spring device being operatively connected to the actuation device of the control valve in order to switch the control valve depending on an air spring stroke, the compression spring device being configured with at least two parts including a central spring facing towards the rolling tube or the lid and a control valve biasing spring facing towards the control valve, the central spring being biased to a greater extent than the control valve biasing spring.

2. The air spring assembly according to claim 1, wherein the compression spring device has a guide tube mounted in an axially freely movable manner between the rolling tube and the lid, the central spring and the control valve biasing spring being disposed on the guide tube.

3. The air spring assembly according to claim 1, further comprising biasing members for biasing the central spring and the control valve biasing spring, the biasing members being disposed at an upper end and at a lower end of a guide tube.

4. The air spring assembly according to claim 3, wherein the biasing members are freely movable between end stops on the guide tube.

5. The air spring assembly according to claim 1, wherein the control valve is configured in two parts including an inlet valve and an outlet valve.

6. The air spring assembly according to claim 5, wherein the inlet valve and the outlet valve are configured as spring valves.

7. The air spring assembly according to claim 5, wherein the inlet valve and the outlet valve are disposed in a region of the lid.

8. The air spring assembly according to claim 5, wherein the outlet valve and the inlet valve are configured with the outlet valve closed and the inlet valve open in a compressed position of the air spring assembly.

9. The air spring assembly according to claim 5, wherein the outlet valve and the inlet valve are configured with the outlet valve open and the inlet valve closed in an expanded position of the air spring assembly.

10. The air spring assembly according to claim 5, wherein spring forces of the central spring, the control valve biasing spring and the spring valves are set with a predetermined switching order maintained during compression or expansion of the air spring assembly.

11. The air spring assembly according to claim 5, wherein the inlet valve has a two-stage configuration.

12. The air spring assembly according to claim 1, further comprising an auxiliary compression spring configured to assist a movement of a guide tube during expansion of the air spring assembly.

* * * * *